April 20, 1954 V. J. STEPHENSON 2,676,224
TEMPERATURE SENSITIVE DEVICE
Filed Oct. 4, 1948 2 Sheets-Sheet 1
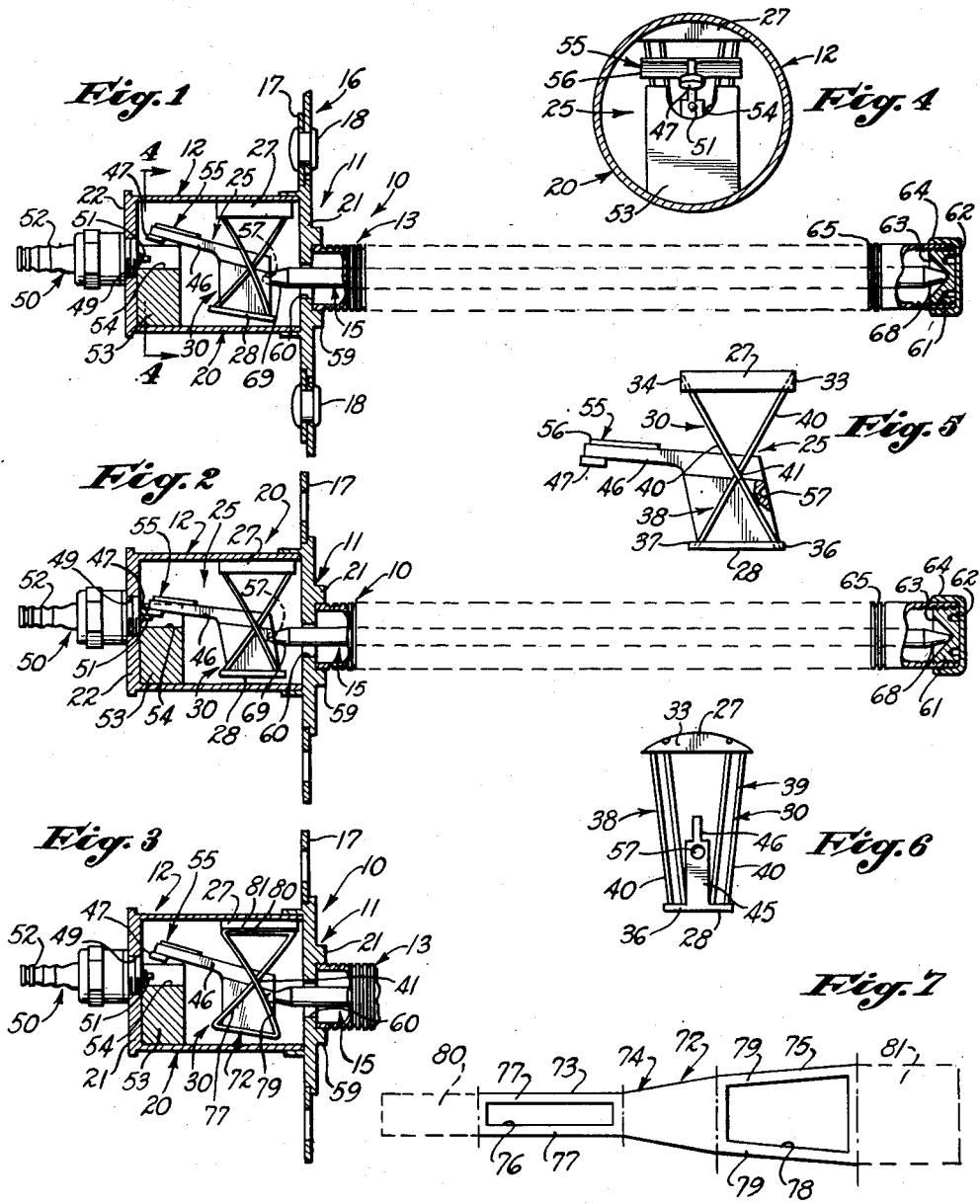
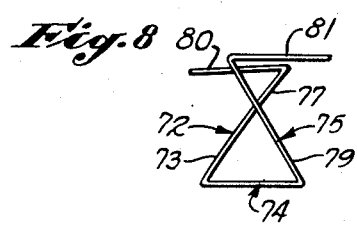
INVENTOR:
VERL J. STEPHENSON
BY HIS ATTORNEYS
HARRIS, KIECH, FOSTER & HARRIS April 20, 1954 V. J. STEPHENSON 2,676,224
TEMPERATURE SENSITIVE DEVICE
Filed Oct. 4, 1948 2 Sheets-Sheet 2
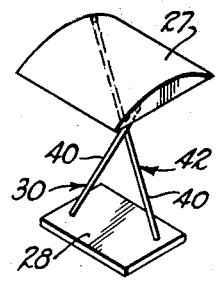
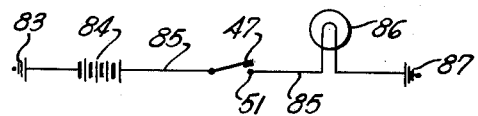
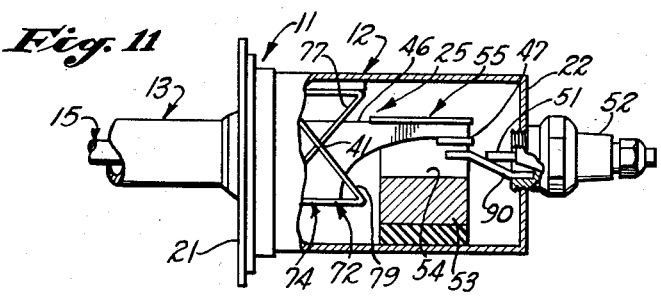
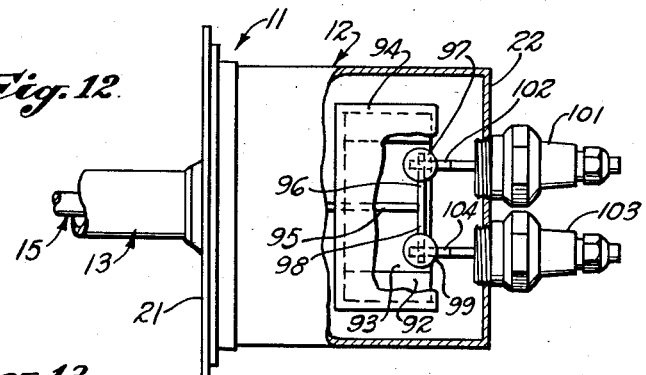
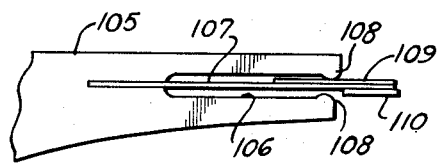
INVENTOR:
VERL J. STEPHENSON
BY HIS ATTORNEYS
HARRIS, KIECH, FOSTER & HARRIS Patented Apr. 20, 1954

2,676,224

UNITED STATES PATENT OFFICE 2,676,224

TEMPERATURE SENSITIVE DEVICE

Verl J. Stephenson, Glendale, Calif., assignor, by mesne assignments, to A. C. Palmer Construction Co., a corporation of California Application October 4, 1948, Serial No. 52,692

16 Claims. (Cl. 200—137)

This invention relates to improvements in temperature sensitive devices and more particularly to a temperature sensitive device whose operation is based upon the principle of the differential thermal expansion of two materials and to a novel switch therefor.

Devices of this type may be utilized in a wide variety of applications such as the control of duct and oven temperatures, the maintenance of mixtures within vessels at predetermined temperatures and may also be embodied in alarm circuits where the detection by the device of a departure from a temperature establishes as a predetermined norm will cause the actuation of an alarm or activate an automatic fire control system. My invention may be embodied in instruments which are adapted to indicate a departure from a predetermined norm, and it is also intended to permit alternatively the detection of temperature changes above or below a predetermined norm.

In order to facilitate the description of the construction and mode of operation of my invention, it will be described as utilized to detect the rise in temperature above a predetermined norm within a compartment of an aircraft but it is, of course, not intended that the instrument be limited to the specific application discussed.

One of the major difficulties encountered in prior art instruments has been the fact that when an instrument has been set to a predetermined norm, the permissible range of expansion of the relatively thermally expansible element embodied in the instrument has been limited by the necessary physical bond between it and the relatively thermally nonexpansible elements with which it is associated. Instruments of the prior art type usually consist of a housing formed of thermally expansible material and one or more flexible elements formed of relatively nonexpansible material mounted within the housing and having secured thereto electrical contacts adapted to make or break a circuit. The ends of the flexible relatively thermally nonexpansible elements are positively secured to portions of the interior of the expansible housing and when the expansible housing is thermally expanded by temperatures beyond a predetermined norm, it frequently happens that the continued expansion of the housing will cause the thermally nonexpansive elements to be forcibly severed from their connection with the portions of the interior of the housing to which they are secured. Since it is of utmost importance that instruments of this type be available for continued use and since it is most critical in applications in aircraft that fire detection instruments be capable of indicating a renewed fire in a compartment when it has once been quenched, it is readily obvious that instruments which are subject to such physical failures are not reliable enough for aircraft installation.

It is, therefore, a primary object of my invention to provide a temperature sensitive device which embodies a thermally expansible element adapted to cooperate with a relatively thermally nonexpansible element which is so associated with the thermally expansible element that the overexpansion of the thermally expansible element will not cause the destruction of the relatively thermally nonexpansive element and the instrument will thus be always ready to indicate a renewed departure from a predetermined norm despite the fact that it has been subjected to unusually high temperatures sufficient to destroy prior art instruments.

Temperature sensitive devices are frequently mounted within the nacelle structure of an aircraft to permit the instantaneous detection of fires arising in the engine compartment and the usual place in which such instruments are mounted is the fire wall of the nacelle structure itself. Of course, instruments adapted to detect the departure of the nacelle temperatures above a predetermined norm may be located anywhere within the engine compartment, but it has been customary to mount such instruments in the fire wall structure. When mounted in the fire wall, the fire detection instruments are subjected to excessive vibration due to the continuous vibration cycles established within the nacelle structure by the operation of the power plant while the aircraft is in flight. Since typical fire detection instruments usually embody resilient, relatively thermally nonexpansible elements, the subjection of these instruments to the extreme vibration cycles established within the engine compartment frequently results in the inadvertent making and breaking of the circuit of the fire alarm system associated with the instruments and a false signal is thus given to the pilot who has no means of telling whether the signal given is a false one. In addition, where instruments of this type are embodied in automatic fire quenching systems where the activation of the instruments automatically initiates the quenching of the fire within the compartment, it is obvious that undesirable expenditure of needed fire quenching materials may result.

Another object of my invention is the provision of a temperature sensitive device which is capable of being subjected to excessive vibrational frequencies without giving a false signal. This desirable result is attained by eliminating the use of flexible thermally nonexpansible elements and by substituting therefor a substantially rigid thermally nonexpansible element which is not responsive to vibrational frequencies in a manner which will cause the alarm circuit to be inadvertently activated. In addition, the relatively nonexpansible element incorporated in my invention is so mounted that a large proportion of the vibration sustained thereby is absorbed by the flexible mounting of the element.

Temperature sensitive devices of the class in which my invention falls, when mounted within the nacelle structure of aircraft, are frequently subjected to intense shock loads and the failure of prior art instruments under such loads has resulted in high maintenance costs of such instruments.

It is a further object of my invention to provide a temperature sensitive device in which the various components of the device are so mounted that shock loads may be absorbed by the various components of the instrument. This shock absorption feature of my invention is obtained by mounting the relatively thermally nonexpansible element within the thermally expansible member and supporting one end of the element upon a spring-biased operable member which is designed to distort sufficiently to permit the absorption thereby of shock loads sustained by the instrument.

It is another object of my invention to provide a temperature sensitive device incorporating an operable element which consists of an electrical switch associated with the relatively thermally nonexpansible element which is adapted to be positioned in a pretensioned state without becoming permanently set.

Because of the wide variety of applications in which thermally responsive devices of the type under discussion may be utilized, it is desirable that the range of adjustment of the instrument be such that the instrument can be set to detect temperature variations over a wide range. An additional object of my invention is the provision in the temperature sensitive device constructed in accordance therewith of adjustment means which is designed to permit the adjustment of the instrument to predetermined norms over a wide temperature range and to permit the adjustment to these predetermined norms with a fidelity which has not been previously attainable because of the utilization of flexible, relatively thermally nonexpansible elements. In prior art instruments, the adjustment of the instruments has been attained by expanding or contracting the flexible, nonexpansible elements in relation to each other. The adjustment of a temperature sensitive instrument constructed in accordance with my invention is achieved by shifting the relatively nonexpansible element along its axis in relation to the relatively thermally expansible element in which it is housed and an extremely accurate setting of the instrument to a predetermined norm may be attained.

By my instrument I also provide a temperature sensitive device which is extremely sensitive and which is adapted to indicate departures from a predetermined norm as low as or less than one degree Fahrenheit. This desirable result is attained by the utilization in my invention of a relatively inflexible thermally nonexpansible element in conjunction with the thermally expansible element. The slightest expansion of the thermally expansible element is immediately transmitted through the inflexible thermally nonexpansible element to the operable means incorporated in the instrument.

It is a further object of my invention to provide an instrument of the type under discussion which is characterized by a small number of component parts and which may be easily manufactured and assembled. The instrument is light in weight and may be manufactured and sold at a moderate cost. Because of the relative durability of the instrument, maintenance costs attendant upon its continued operation are low.

A further object of my invention is to provide a novel type of electrical switch in which one of the switch contacts is mounted upon a resilient base construction. Another object of the invention is to provide, as an article of manufacture, a blank that is cheap and simple to make and which can be formed readily to provide such a resilient base construction.

Other objects and advantages of my invention will be apparent from the following specification and the accompanying drawings which are intended for the purpose of illustration only, and in which:

Fig. 1 is a longitudinal, partly sectional view of a preferred embodiment of my invention showing the instrument as pre-set to a predetermined norm and with the thermally expansible element in a nonexpanded state;

Fig. 2 is a longitudinal, partly sectional view showing the instrument with the thermally expansible element in its expanded state, thus causing the switch incorporated in the instrument to make a circuit;

Fig. 3 is a fragmentary sectional view showing a modification of the switch structure incorporated in the instrument;

Fig. 4 is a cross-sectional, enlarged view taken on broken line 4—4 of Fig. 1;

Fig. 5 is an enlarged, detailed, elevational view showing the construction of the switch incorporated in the instrument and shown in Fig. 1;

Fig. 6 is a front elevational view of the switch construction shown in Fig. 5;

Fig. 7 is a top plan view of the alternative switch construction shown in Fig. 3 in its expanded state;

Fig. 8 shows the switch construction of Fig. 7 in side elevation when partly assembled;

Fig. 9 is a front elevation of another alternative form of the connecting means of the switch;

Fig. 10 is a schematic diagram of an electrical circuit embodying the invention;

Fig. 11 is a partly elevational, partly sectional view of a modification of the temperature sensitive device;

Fig. 12 is a partly sectional, partly elevational view of still another modification of the temperature sensitive device; and Fig. 13 is an enlarged, fragmentary view of an alternative form of the contact.

Referring to Fig. 1 of the drawings, I show a temperature sensitive device 10, including a housing 11 which is constituted by a switch housing 12 and a tubular element 13 formed of a material having a relatively high coefficient of expansion, such as, for example, silver. Mounted within the tubular element 13 and protruding into the interior of the switch housing 12 is a rod element 15 whose longitudinal axis is substantially parallel to the longitudinal axis of the tubular element, the rod element 15 being formed of a material having a relatively low coefficient of expansion, such as, for example, fused quartz. The instrument is shown mounted upon a fire wall 16 of an engine nacelle structure of an aircraft (not shown) through the medium of a mounting plate 17 which is secured to the fire wall 16 by means of rivets 18, or similar fasteners. The switch housing 12 is disposed on one side of the fire wall 16 and the tubular element 13 is positioned on the side of the fire wall 16 which faces the engine compartment, thus placing the element 13 within the engine compartment and permitting it to be subjected to the ambient temperature variations occurring within the compartment.

The switch housing 12 includes a generally cylindrical member 20, preferably formed of a suitable metal, having a forward end wall 21 and a rear end wall 22. Upon the interior of the member 20 is mounted an electric switch means 25. It is, of course, conceivable that another operable member might be substituted for the electric switch 25, and it is not intended that the invention be limited to the specific type of operable member shown since it is possible that a pneumatic valve or similar element susceptible to operation by the differential thermal expansion of the tubular element 13 and the rod element 15 might be incorporated in the instrument. However, it is intended that the operable member, whatever its nature may be, incorporated within the housing 12 embody the mechanical principles of the switch 25, which will be described in greater detail below.

The switch 25, as best shown in Figs. 1, 4, 5, and 6, includes a nonmovable mounting plate 27, suitably fixed to the inner wall of the cylindrical member 20, and a movable contact plate 28 which is spaced therefrom and which is connected to the mounting plate 27 through the medium of connecting means 30 to permit the longitudinal translation in an arcuate path of the contact plate 28 below the mounting plate 27. The mounting plate 27 has a forward end 33 and a rearward end 34 disposed in substantial parallelism with the forward wall 21 of the housing 12.

The movable contact plate 28 has a forward end 36 and a rearward end 37. The connecting means 30 includes two pairs 38 and 39 of resilient, elongated elements 40, preferably formed of spring wire stock, which provide a spring structure adapted to permit the longitudinal deflection in an arcuate path of the movable contact plate 28. As best shown in Figs. 5 and 6, one pair 38 of the resilient elements 40 is disposed at one side of the mounting plate 27 and one side of the movable contact plate 28 and the other pair 39 of elements 40 is disposed at the other side of the mounting plate 27 and the movable contact plate 28. The resilient elements 40 of each pair intersect each other intermediate their respective ends and thus provide an axis of rotation 41 which is positioned substantially intermediate the mounting plate 27 and the contact plate 28 and about which the contact plate 28 is adapted to move in an arcuate path.

As best shown in Fig. 4, in order to permit the intersection of the elements 40 of each pair, one of the elements 40 of each pair is disposed between the mounting plate 27 and the contact plate 28 inside of the other element 40 of the pair, and the outer of the elements of both pairs has its upper end affixed to the mounting plate 27 near the rear end 34 of the mounting plate and its lower end affixed to the forward end 36 of the contact plate 28 while the inner elements 40 of the two pairs have their upper ends affixed to the forward end 33 of the mounting plate 27 and their lower ends affixed to the rearward end 37 of the contact plate 28. Thus, the ends of the elements 40 constituting each pair are disposed opposite each other.

Secured to the movable mounting plate 28, as by means of screws or welding, or formed integrally therewith, is a slightly resilient, contact arm 46 extending in the direction of the rear end wall 22 of the housing 12. Supported upon the extreme outer end of the contact arm 46 and disposed on the under side thereof and electrically connected thereto is an electrical contact 47.

A centrally located, threaded opening 49 is formed in the rear end wall 22 of the housing 12 and is adapted to have threadedly engaged therewith a contact means 50 which supports a contact 51 within the housing 12 and which is preferably a conventional, miniature spark plug 52. Of course, other means of introducing a conductor into the interior of the housing 12 may be utilized without departing from the concept of my invention but the spark plug 52 provides a very reliable means of introducing a contact which is capable of sustaining wide temperature variations into the housing 12 and which provides desirable electrical insulation between the end wall and the contact 51 and a desirable seal for the opening 49.

Mounted within the housing 12 contiguous to the interior of the rear wall 22 is a permanent magnet 53 having an arcuate slot 54 formed therein into which the contact 51 protrudes. Secured to the upper side of the resilient contact arm 46 is an armature 55 which is constituted by a generally rectangular plate 56 adapted to cooperate with the permanent magnet 53 in such a manner that when the contact 47 mounted upon the arm 46 approaches the contact 51 of the spark plug 52, the resilient arm 46 will be deflected downwardly and a snap action will take place and the contacts 47 and 51 will be swiftly drawn together into electrical contact. By the utilization of this construction arcing which might occur if the contacts were to be brought together gradually over the expansion range of the thermally expansible element 13 is obviated, and the life of the contacts 47 and 51 is materially prolonged. A conical seat 57 is formed in the contact arm 46 and faces in the direction of the inner side of the forward end wall 21.

The tubular element 13 is mounted in an annular boss 59 formed in the face of the forward wall 21 of the housing 12, which surrounds an opening 60 in the forward end wall 21 of the housing 12. However, the center of the opening 60 is eccentrically positioned in relation to the longitudinal axis of the tubular member 13 for a purpose which will be described in greater detail below. Threadedly engaged in the opposite end of the member 13 is a plug 61 which is provided with a plurality of depressions 62 which are adapted to receive a suitable tool to permit the rotation of the plug within the end of the tube 58. The inner face of the plug 61 is provided with a conical seat 63 which is adapted to cooperate with the conical seat 57 in the block 45 to support the relatively thermally nonexpansible element 15, which may be made of quartz or other suitable material having a low coefficient of expansion. Positioned upon the end of the element 13 and designed to prevent inadvertent turning of the plug 61 is a sealing cap 64 which can be readily removed to facilitate the adjustment of the instrument to a predetermined norm. Integrally formed in the body of the element 13 upon the outer surface thereof is a plurality of circumferential fins 65 which facilitate the absorption and dissipation of heat by the material of which the tube is formed. In the present instance, the tube is formed of a material such as silver which possesses a very high coefficient of expansion and which is capable of readily absorbing and as readily dispelling heat from and into the ambient air.

When the device 10 is installed, the parts are initially disposed in substantially the positions shown in Fig. 2, in which the switch contacts 47 and 51 are in electrical contact and the conical end 68 of the rod 15 is not quite to the end of the conical recess 63. Rotation of the plug 61 into the tubular element 13 first seats the end 68 in the conical recess 63, and then the rod element 15 is moved bodily to the left, as seen in Fig. 2. This exerts a left-hand force on the contact arm 46 which causes the movable plate 28 to rotate about the pivotal point 41, the connection 30 permitting such movement, to a position such as shown in Fig. 1 in which the contacts 47 and 51 are out of engagement. The distance that the rod element 15 is initially moved to the left, as seen in Figs. 1 and 2, by rotation of the plug 61, depends upon the desired setting of the device for a predetermined norm, as will be described hereinafter.

Although the rod element 15 is shown suspended between the seats 57 and 63, it may be desirable in specific applications of the invention to provide for a positive connection to either the switch 25 or the plug 61. However, it is desirable that no positive connection be made between the tubular element 13 and the switch 25 through the medium of the rod element 15 which would permit the rod element to be broken by overexpansion of the tubular element or which would cause overexpansion of the tubular element to carry the rod element longitudinally to such an extent that the switch 25 would be permanently set or torn from its mounting within the housing 12.

Because of the manner of mounting the rod element 15 within the tubular element, it is possible to use a relatively thermally nonexpansible element which is substantially inflexible in nature. The utilization of a substantially inflexible nonexpansible member permits an immediate indication of any expansion of the expansible member 13 since the slightest expansion of the expansible member 13 is communicated to the relatively nonexpansible member 15, and no play or slop such as that encountered in those instruments embodying resilient nonexpansible members is possible. For instance, should the expansible member 13 be subjected to heat above a predetermined norm, the expansion of the member 13 will cause the outward movement of the plug 61. Simultaneously, the spring action of the switch 25 will urge the thermally nonexpansible member 15 outwardly concomitantly with the outward movement of the plug 61, thus permitting the downward movement of the contact 47 into contact with the contact member 51.

Due to the fact that the thermally nonexpansible member 15 is formed of a substantially inflexible material, the inadvertent closing of the contacts 47 and 51 due to vibration to which the instrument is subjected is rendered impossible. In addition, the mounting of the element 15 upon the flexible switch 25 serves to permit the translation of shock loads borne upon the instrument through the rod element and into the resilient connection 30 of the switch 25 which will deflect slightly but sufficiently to permit the absorption of such shock loads in the spring connection 30 rather than in the substantially inflexible rod element itself. Thus, failures incident to shock loads borne upon the instrument are obviated.

Because my invention permits the use of a substantially inflexible, thermally nonexpansible element in conjunction with a thermally expansible element having a high coefficient of expansion, the slightest variation in temperature from a predetermined norm may be ascertained. This is due to the fact that the substantially inflexible element has a very low coefficient of expansion. Therefore, when the thermally expansible element is expanded by being subjected to even the slightest departure from a temperature established as a predetermined norm, the expansible element will tend to expand while the relatively inflexible nonexpansible element will tend to remain substantially stable. Therefore, the slightest variation in temperature from a predetermined norm may be readily ascertained.

When the expansion of the expansible element 13 takes place, the element 15 is driven outwardly until the contact 47 makes the circuit with contact 51. During the movement of the contact plate 28 to close the contacts 47 and 51, the end of the element 15 is carried upwardly in the seat 57. However, when the switch 25 reaches a condition of rest it will no longer tend to urge the rod 15 into contact with the plug 61 upon further expansion of the element 13. Thus, the end of the rod may drop from the seat 57, and it is then that the wall of the opening 68 provides a support for the free end of the rod to keep it from falling into a position where it cannot engage the seat 57 upon return of the expansible element 13 to its unexpanded state. The shrinking of the expansible element 13 will cause the element 15 to contact and slip into the seat 57. As the movement of the element 15 forces the contact plate 28 over center in its arcuate path, the end 69 of the rod will be carried down in the seat 57 by the downward movement of the end of the arm 46. The eccentric relationship of the center of the hole 68 to the axis of the tube 58 will permit this downward movement of the rod 15 to a predetermined point.

All the elements of the instrument described above, other than the ceramic core of the spark plug 52, are electrically conductive since the instrument is designed for single wire operation.

Figs. 7 and 8 show an alternative form of connecting means 72, adapted to be utilized in the construction of the switch 25 in place of the connecting means 30 and the plates 27 and 28, being preferably stamped in the form shown in Fig. 7 from a strip of flat spring stock of uniform thickness. It includes a first resilient connector portion 73 connected to an intermediate contact portion 74 which, in turn, is connected to a second resilient connector portion 75. Because the connecting means 74 may be formed of flat strip stock, it is capable of being more cheaply and easily fabricated than the connecting means 30 which is formed of a plurality of separate spring wire elements. The first connector portion 73 has a hole 76 formed therein which divides the connector portion 73 into two resilient, elongated strips 77. An opening 78 is provided in the second connector portion 75 which is adapted to provide the connector portion 75 with two resilient, elongated strips 79. The resilient elongated strips 77 and 79 supplant the resilient, elongated elements of the connector means 30 and are adapted to function in the same fashion, as is clearly shown in Fig. 3 of the drawings, which discloses a switch structure embodying the connecting means 72.

As best shown in Fig. 8 of the drawings, the flat strip which constitutes the resilient connector means 72 is so formed that the first connector portion 73 is passed through the opening 78 in the second connector portion 75 to permit the intersection of the resilient, elongated strips 77 and 79 in a manner analogous to the intersection of the resilient, elongated elements 40 of the connector means 30. The resilient connecting means 72 is provided with integral mounting portions 80 and 81 which are adapted to be joined to each other when the connecting means 72 is formed into its operative configuration and to be mounted upon the wall of the housing 12. If desired, the connecting means 72 may be formed with only one resilient, elongated strip 77 and only one resilient, elongated strip 79 disposed at opposite sides of the switch 25 and thus eliminate two of the resilient, elongated connecting elements. This construction is especially feasible when the connecting means 72 is utilized because the elongated strips 77 and 79 are particularly resistant to torsional forces imposed upon the switch 25 during its operation.

An alternative embodiment of the switch 42 is shown in Fig. 9 of the drawings. One of the resilient, elongated members 40 is disposed at one side of the mounting plate 27 and its associated contact plate 28, and the other elongated, resilient element 40 is disposed at the other side of the mounting plate 27 and movable contact plate 28. The ends of the resilient elements 40 are oppositely disposed so that the elements 40 intersect intermediate the ends thereof and provide a point of rotation disposed substantially intermediate the space between the mounting plate 27 and the movable contact plate 28.

A schematic circuit diagram is shown in Fig. 10 of the drawings, and discloses an electric power source 84 which is grounded at 83 and connected through the medium of a lead 85 to the switch contact 47 adapted to contact the contact 51 which is connected to an alarm light 86 which is grounded at 87. Thus, when the thermal expansion of the expansible element 13 takes place, the closing of the contact 47 upon the contact 51 will cause the alarm 86 to be activated and indicate to the pilot that the temperature has risen beyond a predetermined norm. Of course, any desired element or system may be substituted for the alarm light 86 shown in the schematic diagram, and it is not intended that the invention be limited to the actuation of this specific type of device.

Another embodiment of the temperature sensitive device is shown in Fig. 11 of the drawings. This embodiment is essentially similar to the above-discussed embodiment of the invention except for the fact that it is designed to be used to break a circuit when the ambient air in which it is disposed exceeds a predetermined temperature. Temperature sensitive devices constructed in accordance with the embodiment shown are adapted to be utilized in controlling the maximum heat to which ovens, vats, furnaces and similar heat-producing structures are permitted to operate. Thus, if a furnace is permitted to operate up to but not beyond a temperature of 1500° F. and the temperature exceeds that point, the temperature sensitive device will break the circuit in which it is embodied and deactivate the furnace until the temperature falls below the predetermined norm.

The device includes the housing 11 which provides the switch housing 12 adapted to mount the tubular element 13 and the rod element 15. The switch housing 12 is provided with a front end wall 21 and a rear end wall 22 and houses a switch 25 which is provided with a resilient connecting means 72 consisting of two integral, flexible arms 77 and 79 which support an integral contact plate 74 upon which is mounted a slightly resilient contact arm 46. A contact 47 is mounted upon the underside of the outer end of the contact arm 46. Mounted within the housing 12 and spaced a substantial distance from the rear end wall 22 thereof is a permanent magnet 53 which has formed in the top portion thereof a longitudinal, arcuate groove 54 which is adapted to permit the arm 46 to be moved downwardly within the body of the magnet 53. Suitably mounted on the upper side of the arm 46 is an armature 55 which consists of a rectangular metal plate and which is adapted to be attracted by the magnet 53 when brought in close proximity thereto to cause the minute deflection of the slightly resilient arm 46 to impart a snap action to the switch assembly 25.

Mounted in the rear end wall 22 of the housing 12 is a modified conducting means or spark plug 52 which is provided with a positive electrode 51 which is adapted to be contacted by a resilient electrode 90 which normally remains in contact with the electrode 51 to cause current to flow from the electrode 51 into the electrode 90 and thence into the device which is operated by the current flowing through the electrodes 51 and 90. For instance, the current flowing through the electrodes 51 and 90 can cause the operation of a burner mounted within a furnace or vat.

When the device with which the temperature sensitive device is associated operates below a predetermined temperature, current will be permitted to flow from the electrode 51 into the resilient electrode 90 and thence into the mechanism which is actuated by the current flowing therethrough. However, when the temperature exceeds the predetermined norm, the expansion of the tubular element 13 will permit the longitudinal movement of the rod element 15 and cause the connecting means 72 to move the end of the arm 46 downwardly toward the magnet 53. The downward movement of the arm 46 will cause the contact 47 to strike the resilient electrode 90 and break the contact of the electrode 90 with the electrode 51, thus breaking the circuit and inactivating the device controlled by the temperature sensitive device until the temperature has once again fallen below the predetermined norm.

Another embodiment of my invention, which is adapted to be utilized in a two-wire circuit, is shown in Fig. 12 of the drawings. This embodiment includes the switch housing 12 which mounts the tubular element 13 and the rod element 15, but the housing 12 is of substantially greater diameter than the housing incorporated in the previous embodiments to permit the incorporation therein of double contacts to allow the temperature sensitive device to be incorporated in a two-wire circuit. Mounted on the wall of the housing 12 is a permanent magnet 92 which has formed in the upper portion thereof a longitudinal slot adapted to receive the end of an elongated contact arm 95 which is mounted upon a connecting means, not shown, similar to those described in the above embodiment.

The elongated contact arm 95 is formed of slightly resilient material and is dielectric and of T-shaped configuration. Two contact arms 96 and 98 project at right angles from the end of the contact arm 95 and bear respectively contacts 97 and 99. Mounted in the rear end wall 22 of the housing 12 is a first contact member 101 which consists of a conventional spark plug having an electrode 102 projecting into the interior of the housing 12 and adapted to be contacted by the contact 97 borne upon the arm 96. Mounted adjacent the contact means 101 is a similar contact means 103 which includes an electrode 104 projecting into the interior of the housing 12 and adapted to be contacted by the contact 99 borne upon the arm 98.

The contacts 97 and 99 are normally held away from the contacts 102 and 104 by the action of the rod element 15 against the connecting means, not shown, which supports the elongated contact arm 95. Electric current is brought into the interior of the housing 12 by means of the contact means 101. When the tubular element 13 of the temperature sensitive device is subjected to a temperature which is in excess of a predetermined norm, the expansion of the tubular element 13 will permit the longitudinal shifting of the rod element 15 and cause the connecting means to deflect the elongated contact arm downwardly, thus carrying the contacts 97 and 99 into electrical contact with the electrodes 102 and 104. Since the arms 96 and 98 are electrically conductive and since the contact arm 95 is formed of a suitable dielectric material, the current is channeled through the contact 97, the arms 96 and 98, into the contact 99 and thence into the electrode 104 to a suitable alarm, not shown, or similar instrument, which will be activated by the departure of the temperature from a predetermined norm.

In all of the above-discussed embodiments a magnet and armature means are provided to cause the deflection of the contact arms to impart a snap action when the contact is made or broken. All of the contact arms described in the above-discussed embodiments are slightly resilient in nature, but it may be desired to provide a contact arm which is more resilient than those previously discussed in order to impart a more sensitive and more responsive snap action in either the breaking or the making of the circuit in which the temperature sensitive device is embodied.

A modification of the contact arms adapted to impart a more responsive snap action in the making and breaking of the circuits in which the temperature sensitive device is embodied is shown in Fig. 13 of the drawings. The contact arm 105 is mounted in the conventional manner upon a connecting means, not shown, and has a bifurcated end portion which provides an elongated opening 106. Disposed within the opening 106 and having one end fastened in the body of the contact arm 105 and its other end projecting from the opening, is a resilient contact blade 107 which bears upon the underside of its outer end a contact 110. Formed integrally with the extreme outer end portion of the contact arm 105 and adapted to limit the upward and downward movement of the contact blade 107, are stop bosses 108. Secured to the upper surface of the contact blade 107 is a rectangular armature 109 which is adapted to cooperate with a permanent magnet, not shown, in a manner essentially similar to that in which the armatures previously described cooperate with the permanent magnets embodied in the temperature sensitive device.

Thus, when the armature 109 comes within the magnetic range of the permanent magnet, the magnetic attraction of the magnet for the armature 109 causes the immediate deflection of the contact blade 107 and brings the contact 110 into operative relationship with the member upon which it is designed to impinge. This modification of the contact arm permits a more sensitive snap action to be imparted to the contact arm and facilitates the making and breaking of the electrical circuit in which the temperature sensitive device is incorporated.

I thus provide by my invention a temperature sensitive device or instrument which is adapted to indicate a predetermined rise of temperature in the ambient air from a predetermined norm. It may also be employed to indicate a predetermined drop in temperature as in an oven or water heater when the burner is extinguished. An instrument constructed in accordance with my invention consists of a minimum number of easily manufactured parts which may be readily and inexpensively manufactured. The instrument will not give a false signal when subjected to excessive vibration, nor will failure of the instrument be occasioned when it is subjected to intense shock loads. Further, due to the unique method of suspending the relatively thermally nonexpansible element of the instrument, the permanent set or distortion of the instrument due to its subjection to excessive temperatures will not occur. Because a substantially inflexible, thermally nonexpansible element may be utilized in the instrument, it is capable, when so adjusted initially, of indicating minute variations in temperature from a predetermined norm and is also adapted to give a substantially immediate indication of such departures from the predetermined norm, the time lag being very low.

Although I have shown the electric switch 25 as embodied in a temperature indicating device, it will be apparent to those skilled in the art that my switch has many other applications, and I do not intend to be limited to its use in such an instrument.

Although I have shown and described preferred embodiments of my invention, it will be understood that certain elements thereof may be replaced by other elements without departing from the spirit of my invention and I do not intend to be limited to the specific embodiments shown but desire to be afforded the full scope of the following claims.

I claim as my invention:

1. A thermostatic indicator control including, in combination: a housing; a thermally expansible tube secured to said housing; a relatively thermally nonexpansible rod disposed within said tube; and a spring-biased switch mounted within said housing in contact with one end of said rod adapted to urge the other end thereof into operative relationship with said tube, said switch including a contact plate supported upon said housing by a hinge structure comprising two pairs of resilient, elongated elements intersecting each other intermediate their ends and having said ends fastened respectively to said housing and said contact plate at opposite portions thereof, said hinge structure having an axis of rotation that is transverse to said elements whereby said contact plate is rotatable thereabout relative to said housing, said contact plate having a contact arm mounted thereupon and said rod engaging said arm along a line transverse to said axis of rotation but offset therefrom and also offset from said two elongated elements between the ends thereof.

2. In an electric switch including a mounting means and a contact member adapted to be supported therefrom, the combination of: a connecting means adapted to support said contact member upon said mounting means including a hinge structure comprising a pair of resilient elements having intersecting axes, the point of intersection of said axes being substantially intermediate the distance between said mounting means and said contact member, said resilient elements having opposite ends thereof connected to opposite portions of said mounting means and said contact member whereby said contact member is adapted to be moved in an arc about an axis of rotation transverse to said elements, said contact member being located centrally of said elongated elements and engageable by an actuator at a point that is offset from the axis of rotation thereof and that is at the intersection of two normals to the respective elements, which normals intersect the respective elements between the respective ends thereof.

3. An article of manufacture including: a first resilient connector portion; an intermediate mobile plate portion formed integrally with said first connector portion; and a second resilient connector portion formed integrally with said mobile portion, the axes of said connector portions intersecting to provide an axis of rotation about which said mobile plate portion is adapted to be arcuately transposed.

4. An article of manufacture including: a first resilient connector portion; an intermediate mobile plate portion; and a second resilient connector portion having an opening formed therein adapted to permit the insertion therethrough of said first resilient connector portion to facilitate the intersection of the axes of said first and second resilient connector portions.

5. A temperature sensitive device including, in combination: a housing incorporating a thermally expansible element having a seat formed thereupon; a relatively thermally non-expansible element disposed within said thermally expansible element and engaging said seat in said thermally expansible element; and a spring biased operable means secured to said housing, said spring biased operable means including a contact plate supported upon said housing by a hinge structure comprising a pair of resilient, elongated elements intersecting each other intermediate their ends and having said ends fastened respectively to said housing and said contact plate at opposite portions thereof, said hinge structure being rotatable about an axis of rotation that is transverse to said elements whereby said contact plate is rotatable thereabout relative to said housing, said contact plate having a contact arm mounted thereupon and said relatively thermally non-expansible element engaging said arm along a line transverse to said axis of rotation but offset therefrom and from said two elongated elements between the ends thereof.

6. A temperature sensitive device including, in combination: a housing incorporating a thermally expansible element having a seat formed thereupon; a relatively thermally non-expansible element disposed within said thermally expansible element and engaging said seat in said thermally expansible element; and a spring biased operable means secured to said housing, said spring biased operable means including a contact plate supported upon said housing by two pairs of adjacent resilient, elongated elements intersecting each other intermediate their ends and having said ends fastened respectively to said housing and said contact plate at opposite portions thereof, said contact plate having a contact arm mounted centrally thereof and between said pairs of elements.

7. A temperature sensitive device including, in combination: a housing incorporating a thermally expansible element having a seat formed thereupon; a relatively thermally non-expansible element disposed within said thermally expansible element and engaging said seat in said thermally expansible element; and a switch in said housing, said switch including a first resilient connector portion, an intermediate mobile plate portion formed integrally with said connector portion and a second resilient connector portion formed integrally with said mobile plate portion, the axes of said connector portions intersecting to provide an axis of rotation about which said mobile plate portion is adapted to be arcuately transposed.

8. A temperature sensitive device including, in combination: a housing incorporating a thermally expansible element having a seat formed thereupon; a relatively thermally non-expansible element disposed within said thermally expansible element and engaging said seat in said thermally expansible element; and a switch mounted in said housing, said switch including a first resilient connector portion having an intermediate mobile plate portion formed integrally therewith, and a second resilient connector portion formed integrally with said mobile plate portion, said second resilient connector portion having an opening formed therein adapted to permit the insertion therethrough of said first resilient connector portion to facilitate the intersection of the axes of said first and second resilient connector portions.

9. A temperature sensitive device including, in combination: a housing incorporating a thermally expansible element having a seat formed thereupon; a relatively thermally non-expansible element disposed within said thermally expansible element and engaging said seat in said thermally expansible element; and a switch mounted in said housing, said switch including a first resilient connector portion having an intermediate mobile plate portion formed integrally therewith, and a second resilient connector portion formed integrally with said mobile plate portion, said second resilient connector portion having an opening formed therein adapted to permit the insertion therethrough of said first resilient connector portion to facilitate the intersection of the axes of said first and second resilient connector portions and said first resilient connector portion having a longitudinal opening therein adapted to divide said first resilient connector portion into a plurality of resilient reed elements.

10. An article of manufacture including a first resilient connector portion having an intermediate mobile plate portion formed integrally therewith, and a second resilient connector portion formed integrally with said mobile plate portion, said second resilient connector portion having an opening formed therein adapted to permit the insertion therethrough of said first resilient connector portion to facilitate the intersection of the axes of said first and second resilient connector portions and said first resilient connector portion having a longitudinal opening therein adapted to divide said first resilient connector portion into a plurality of resilient reed elements.

11. A mechanical device comprising a support structure, a contact plate, a hinge structure comprising a pair of resilient elongated elements intersecting each other intermediate their ends and having their ends fastened respectively to said support structure and said contact plate at opposite ends thereof, said contact plate being rotatable about an axis of rotation that is transverse to said elements and a rod member longitudinally movable relative to said support structure along a line transverse to said axis of rotation but offset therefrom and from said two elongated elements between the ends thereof, said rod member engaging said contact plate at a point on said line.

12. A mechanical device comprising a support structure, a contact plate, a hinge structure comprising two pairs of resilient elongated elements that intersect each other intermediate their ends and have their ends fastened respectively to said support structure and said contact plate at opposite ends thereof, said contact plate being rotatable about an axis of rotation that is transverse to said elements and a rod member longitudinally movable relative to said support structure and passing between said pairs of elements along a line transverse to said axis of rotation but offset therefrom and from said elongated elements between the ends thereof, said rod member engaging said contact plate at a point on said line.

13. A mechanical device comprising a support structure, a contact plate, a hinge structure comprising a pair of apertured resilient elements intersecting each other intermediate their ends, one of said elements passing freely through the aperture of the other, the ends of said elements being fastened respectively to said support structure and said contact plate at opposite ends thereof, whereby said contact plate is rotatable about an axis of rotation that is transverse to said elements, and a rod member axially movable relative to said support structure passing through the aperture of said other element along a line transverse to said axis of rotation but offset therefrom, said rod member engaging said contact plate at a point on said line.

14. A mechanical device comprising a support structure, a mobile member, a hinge structure interconnecting said support structure and said mobile member, said hinge structure supplying substantially all of the variable mechanical restoring torque tending to return said mobile member to a predetermined position relative to said support structure when displaced therefrom by an external force, said hinge structure comprising a pair of untaut resilient elongated elements that intersect each other intermediate their ends and have their ends fastened respectively to said support structure and said mobile member at opposite ends thereof, said mobile member being rotatable about an axis of rotation that is transverse to said elements, means for producing a continuously variable force in response to a continuously variable external physical condition, means for applying said force to said mobile member along a line transverse to said axis of rotation and offset therefrom, and means controlled by rotation of said mobile member for opening and closing a circuit in accordance with the magnitude of said force.

15. A mechanical device comprising a support structure, a mobile member, a hinge structure interconnecting said support structure and said mobile member, said hinge structure supplying substantially all of the variable mechanical restoring torque tending to return said mobile member to a predetermined position relative to said support structure when displaced therefrom by an external force, said hinge structure comprising two pairs of untaut resilient elongated elements that intersect each other intermediate their ends and have their ends fastened respectively to said support structure and said mobile member at opposite ends thereof, said mobile member being rotatable about an axis of rotation that is transverse to said elements, means for producing a continuously variable force in response to a continuously variable external physical condition, means for applying said force to said mobile member along a line transverse to said axis of rotation and offset therefrom, and means controlled by rotation of said mobile member for opening and closing a circuit in accordance with the magnitude of said force.

16. A mechanical device comprising a support structure, a mobile member, a hinge structure interconnecting said support structure and said mobile member, said hinge structure supplying all of the variable mechanical restoring torque tending to return said mobile member to a predetermined position relative to said support structure when displaced therefrom by an external force, said hinge structure consisting of a plurality of pairs of untaut resilient elongated elements that intersect each other intermediate their ends and have their ends fastened respectively to said support structure and said mobile member at opposite ends thereof, said mobile member being rotatable about an axis of rotation that is transverse to said elements, means for producing a continuously variable force in response to a continuously variable external physical condition, means for applying said force to said mobile member along a line transverse to said axis of rotation and offset therefrom and means controlled by rotation of said mobile member for opening and closing a circuit in accordance with the magnitude of said force.

References Cited in the file of this patent

UNITED STATES PATENTS

| Number | Name | Date |
|---|---|---|
| 392,617 | Lieb et al. | Nov. 13, 1888 |
| 1,330,892 | Moloney | Feb. 17, 1920 |
| 1,690,049 | Bird | Oct. 30, 1928 |
| 1,902,451 | Johnson | Mar. 21, 1933 |
| 2,089,081 | Wemple | Aug. 3, 1937 |
| 2,221,907 | Bondurant | Nov. 19, 1940 |
| 2,270,738 | Lightfoot | Jan. 20, 1942 |
| 2,354,834 | Robey | Aug. 1, 1944 |
| 2,423,693 | Eaton | July 8, 1947 |
| 2,454,647 | Gille | Nov. 23, 1948 |
| 2,493,323 | Simson | Jan. 3, 1950 |